W. F. McCRACKEN & J. G. BRADFORD.
LACE CABINET.
APPLICATION FILED SEPT. 8, 1909.

944,687.

Patented Dec. 28, 1909.
5 SHEETS—SHEET 1.

Witnesses
M. C. Lyddane
E. M. Ricketts

Inventors
W. F. McCracken and
John G. Bradford
By Watson E. Coleman
Attorney

W. F. McCRACKEN & J. G. BRADFORD.
LACE CABINET.
APPLICATION FILED SEPT. 8, 1909.

944,687.

Patented Dec. 28, 1909.

5 SHEETS—SHEET 3.

Witnesses
M. C. Lyddane
E. M. Ricketts

Inventors
W. F. McCracken and
John G. Bradford

By Watson E. Coleman
Attorney

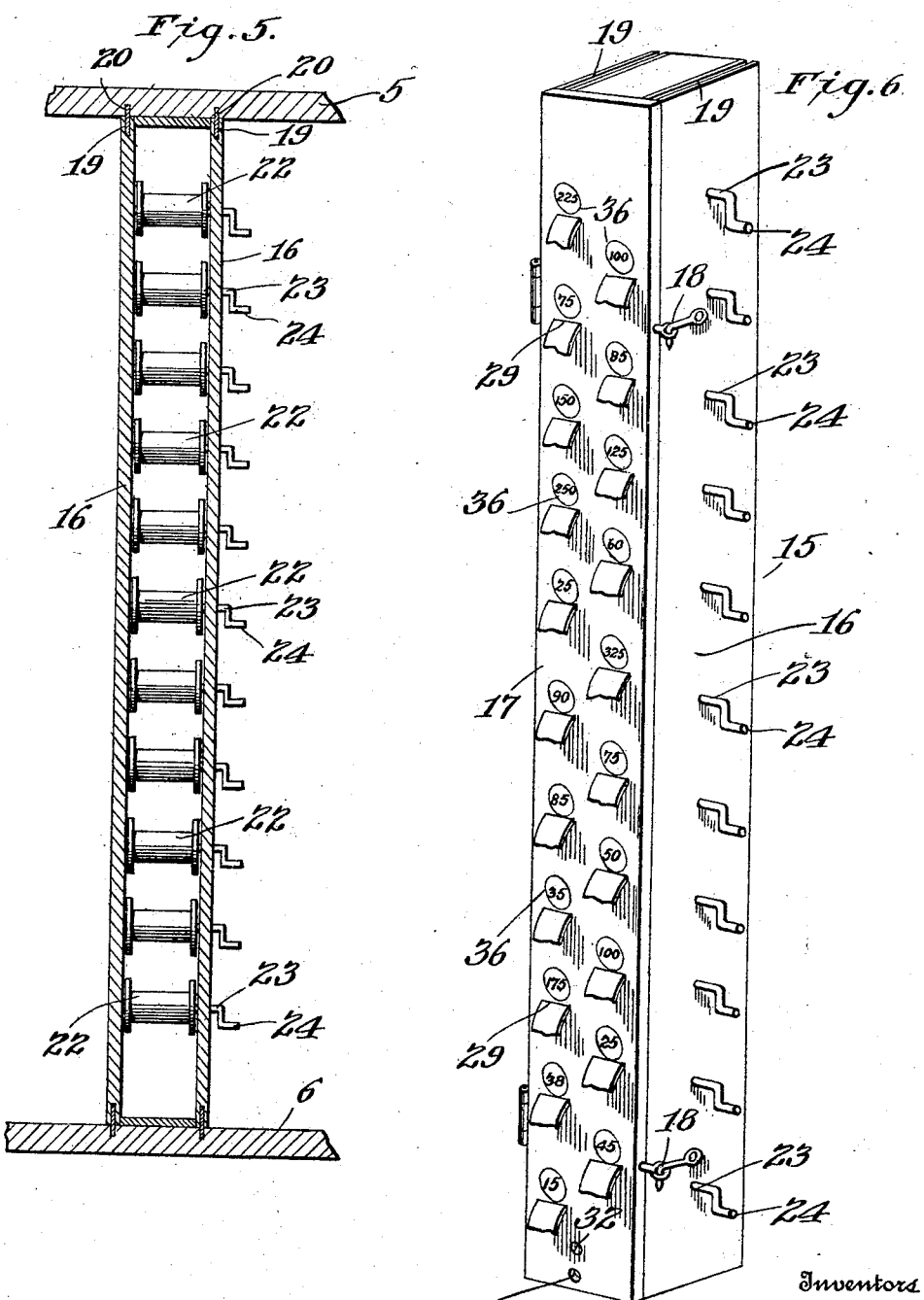

W. F. McCRACKEN & J. G. BRADFORD.
LACE CABINET.
APPLICATION FILED SEPT. 8, 1909.
944,687.
Patented Dec. 28, 1909.
5 SHEETS—SHEET 5.
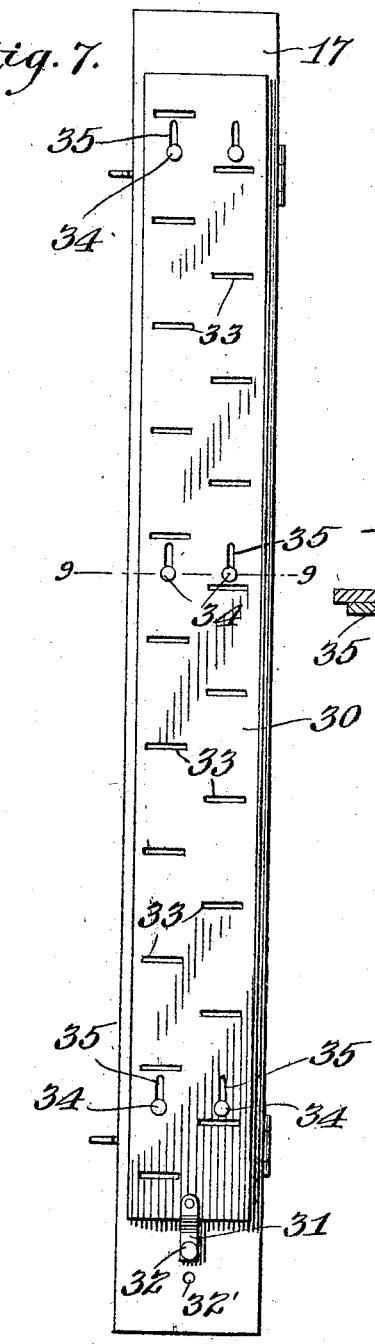
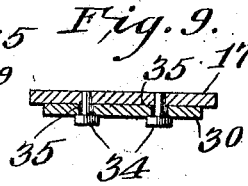
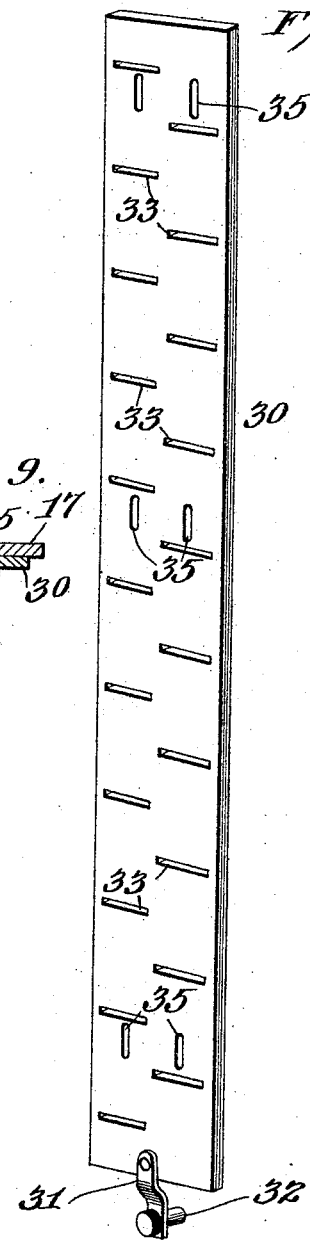
Witnesses
M. C. Lyddane
E. M. Ricketts
Inventors
W. F. McCracken and
John G. Bradford
By Watson E. Coleman
Attorney

UNITED STATES PATENT OFFICE.

WILLIAM F. McCRACKEN AND JOHN G. BRADFORD, OF ANADARKO, OKLAHOMA.

LACE-CABINET.

944,687.                    Specification of Letters Patent.    Patented Dec. 28, 1909.

Application filed September 8, 1909. Serial No. 516,780.

*To all whom it may concern:*

Be it known that we, WILLIAM F. MC-CRACKEN and JOHN G. BRADFORD, citizens of the United States, residing at Anadarko, in the county of Caddo and State of Oklahoma, have invented certain new and useful Improvements in Lace-Cabinets, of which the following is a specification, reference being had to the accompanying drawings.

This invention relates to certain new and useful improvements in display cabinets and has for its object to provide a device of this character for containing, displaying and protecting laces, embroideries and other fine goods of like character, whereby they may be conveniently exhibited and retailed.

Another object is to provide a cabinet which is so constructed that a large assortment of goods may be contained therein, and ready access may be had to any particular grade or pattern.

A further object is to provide a rotatably mounted display cabinet having the prices of the contents conspicuously indicated on the exterior thereof.

A still further object is to provide a plurality of drawers having openings therein and a plurality of circular series of spools containing the laces or other goods which extend through the openings whereby the material may be unwound from the spools as it is sold.

A still further object is to provide a tension plate mounted upon each of the drawer doors and adapted to prevent the unwinding of the materials during the rotation of the cabinet.

With these and other objects in view our invention consists in the improved combination and arrangement of parts which will be hereinafter fully described and particularly set forth in the appended claims.

Figure 1:
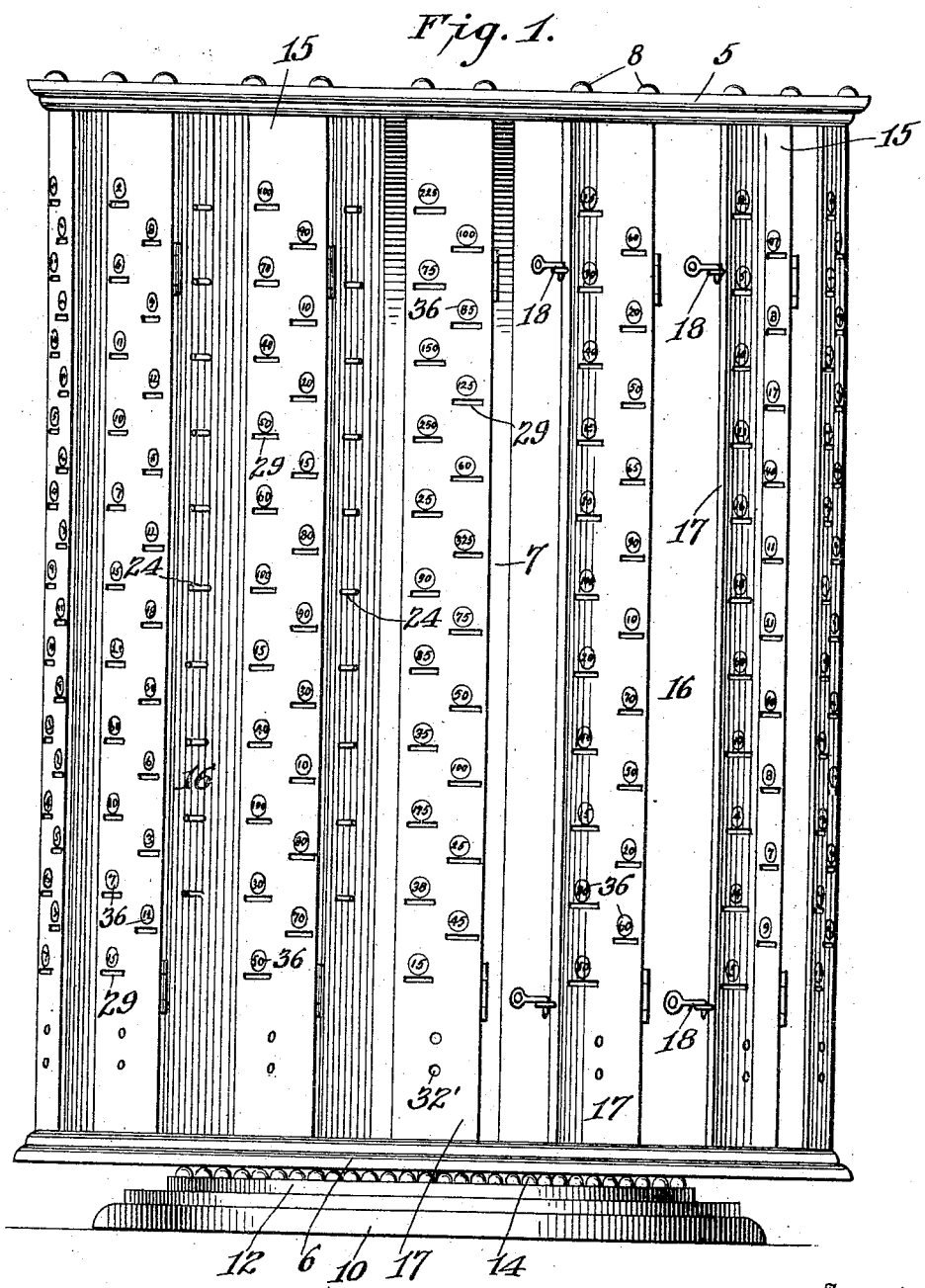
Figure 2:
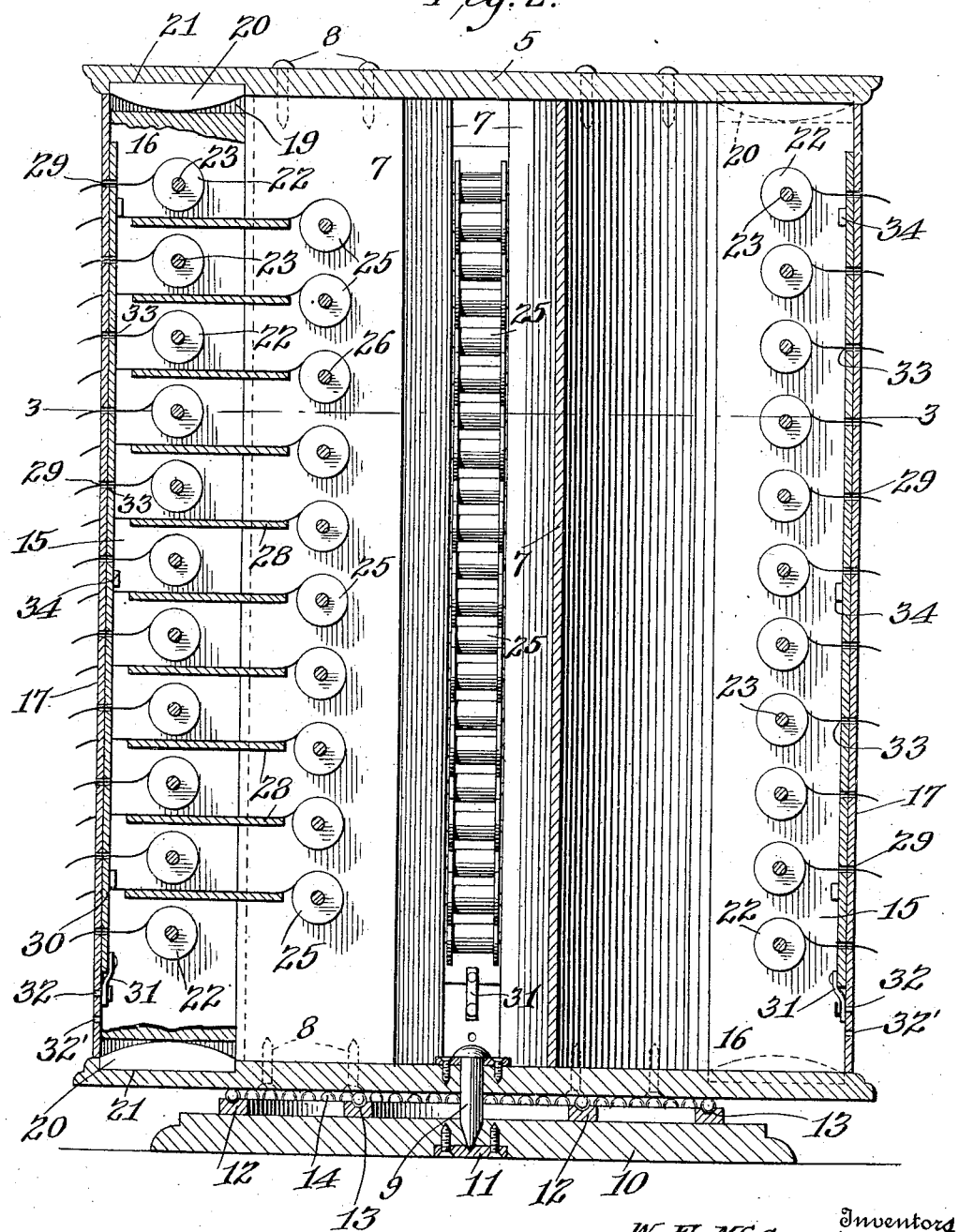
Figure 3:
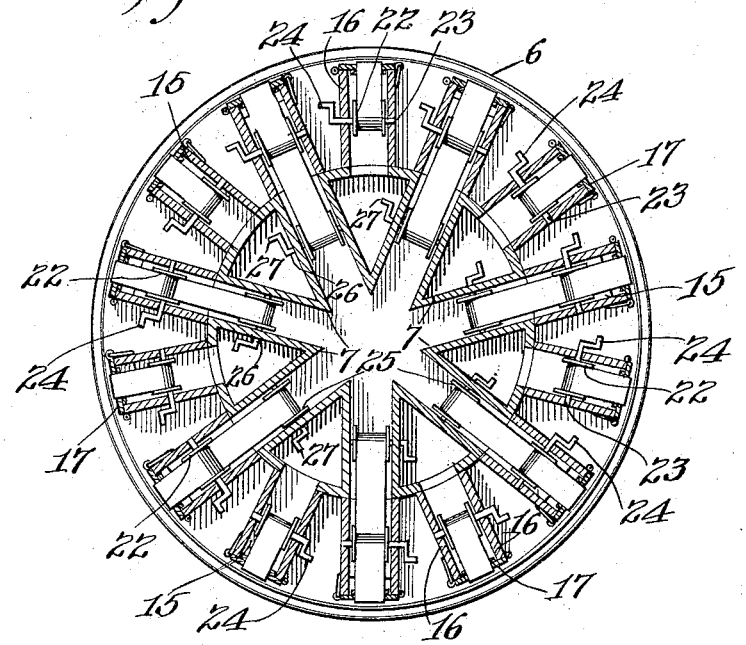
Figure 4:
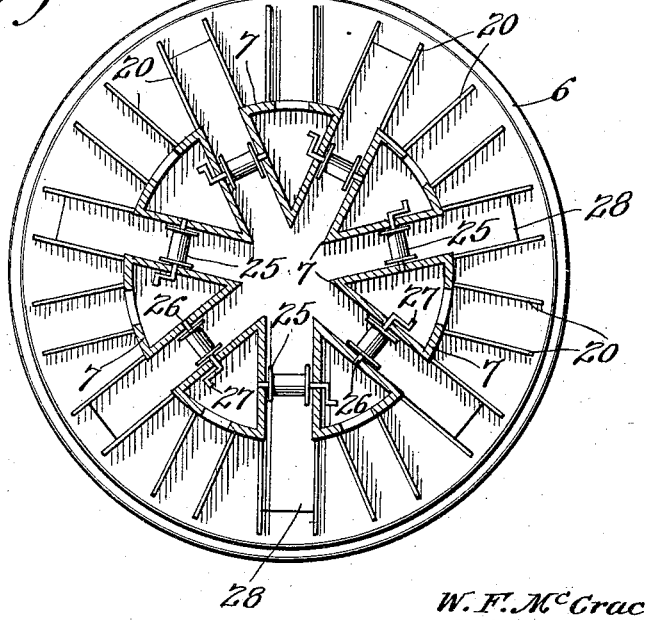

In the accompanying drawings forming a part of this specification and in which similar reference characters indicate like parts, Figure 1 is a side elevation of the display cabinet. Fig. 2 is a vertical longitudinal section. Fig. 3 is a horizontal section on the line 3—3 of Fig. 2. Fig. 4 is a view similar to Fig. 3, the drawers being removed. Fig. 5 is a detail vertical section of one of the drawers. Fig. 6 is a detail perspective view of a drawer. Fig. 7 is a rear elevation of the drawer door. Fig. 8 is a detail perspective view of the tension plate. Fig. 9 is a section on the line 9—9 of Fig. 7.

Referring to the drawings 5 and 6 indicate the upper and lower heads respectively which are rigidly connected by means of the vertical members 7. These members are of substantially V-shaped cross-sectional form and are arranged in circular spaced relation between the heads to which they are secured by means of the screws 8 or other analogous fastening devices. Centrally disposed through the lower head 6 there is a vertical bearing spindle 9 which has a conical lower end seated in a base 10. A plate 11 is secured to the bottom of the base and receives the point of the spindle. Upon the top of the base 10, the concentric bearing rings 12 are located and formed with the ball races 13 to receive the balls 14 on which the cabinet is disposed. In this manner the weight of the cabinet is evenly distributed upon the base and the friction reduced to a minimum.

Between the heads 5 and 6 and in alinement with the space between each of the connecting members 7, a drawer 15 is positioned. These drawers comprise the parallel vertical sides 16 and the door 17 which is hinged to one of the sides and may be closed across the end of the drawer by means of the hooks and eyes 18. The upper and lower ends of each of the sides are provided with the grooves or recesses 19 in which the arcuate plates 20 are received when the drawers are in position. The plates 20 are securely fixed in the grooves 21 in the heads, as clearly shown in Fig. 2 and extend from the connecting members 7 to a point adjacent to the outer circumscribing edges of the heads. The members 7 also provide stops to limit the inward movement of the drawers as they are inserted in position. Additional drawers of similar construction to those above described extend centrally and radially outward from each of the connecting members, thus forming a circular series of spaced drawers. In each of the drawers a plurality of spools 22 are vertically arranged upon the laterally extending shafts 23 which are positioned in the sides 16 of the drawers and have crank handles 24 on one of their ends by means of which the spools may be revolved to wind the material thereon. Another series of spools 25 are mounted between the connecting members 7 upon the shafts 26 which are likewise provided with the crank handles 27. The spools 25 however are located intermediately of the spools 22 and a plate 28 is secured between each of the connecting members and extends outwardly from the spools 25 to a point in advance of the spools 22. These plates support the material on the rear spools and prevent its contact with the spools 22.

The drawer doors are each formed with a plurality of horizontal slots 29 arranged alternately on opposite sides of the center of the doors. Vertically adjustable tension plates 30 are mounted upon the rear faces of the doors and are supported in their adjusted positions by means of the resilient latches 31 which are secured to the bottom of the plates and carry pins 32 for engagement in the openings 32' in the doors. The plates 30 are also formed with the horizontal slots 33 which are adapted to register with the slots 29 in the doors and through which the laces or ribbons carried by the spools are adapted to extend. Headed bolts 34 are secured in the doors and engage in vertical slots 35 formed in the tension plates 30 to provide suitable guides for the plates as they are adjusted upon the doors. Thus it will be seen that the tension plates may be moved downwardly upon the doors and slots 29 and 33 moved from their registering positions to place the necessary tension upon the material and prevent its unwinding from the spools during the rotation of the cabinet. Arranged upon the outer faces of the doors and flush therewith are the price indicating disks 36. These disks are preferably formed of slate or other material from which the indicating marks may be readily removed and replaced by others. They are positioned immediately above each of the slots 29 from which the ribbon or lace protrudes and conspicuously displays its purchase price to the prospective patron.

From the foregoing it will be seen that we have provided a display cabinet particularly designed for containing laces and other fine goods, which is so constructed that a very large assortment of varying grades may be housed and protected and at the same time exhibited to the public for inspection. Access may be very quickly had to any particular spool of material which may be easily unwound and measured without necessitating the opening of the drawer in which it is contained.

The cabinet would preferably be constructed of wood for the sake of cheapness in its manufacture, but it will be obvious that it may as well be constructed of sheet metal. Various other minor modifications may also be resorted to without departing from the spirit or sacrificing any of the advantages of the invention and we reserve the right to make such changes and alterations as we may deem best within the scope of the claims.

Having thus described the invention what is claimed is:

1. A display cabinet comprising upper and lower circular heads, connecting members circularly arranged between the heads, a plurality of drawers arranged between the heads, spools rotatably mounted in said drawers, spools rotatably mounted between the connecting members and intermediate of the first named spools, a hinged door for each of the drawers having slots therein in radial alinement with said spools through which the material to be displayed is adapted to be drawn, means carried by the doors to prevent the withdrawal of the material, in combination with a pivot spindle centrally secured in the lower head, a supporting base having a central cone bearing seat to receive the spindle, ball races concentrically arranged on the base and balls disposed in the ball races to rotatably support the cabinet.

2. A display cabinet comprising upper and lower circular heads, V-shaped connecting members circularly arranged between the heads and secured thereto, a circular series of drawers arranged between the heads and extending radially from the connecting members, spools rotatably mounted and vertically arranged in said drawers, spools rotatably mounted between the connecting members and intermediate of the first named spools, a hinged door for each of said drawers having slots therein opposite to said spools, a vertically slidable tension plate mounted on the inner face of each of the doors, said plate having slots adapted to register with the slots in the doors, through which the material carried by the spools is adapted to be drawn, the movement of said plate being adapted to place the material under tension to prevent its withdrawal, means for holding the plate in its adjusted position, in combination with a vertical bearing spindle carried by the lower head, a supporting base having a central socket to receive said spindle, and ball bearings arranged on said base to rotatably support the cabinet.

3. A display cabinet comprising upper and lower heads, connecting members arranged between the heads and secured thereto, arcuate guide plates secured in the heads and extending outwardly of the connecting members, a circular series of drawers having grooves at the top and bottom to receive said guide plates, a plurality of spools rotatably mounted in each of said drawers, said drawers having horizontal slots therein opposite to the spools, a hinged door for each of the drawers, a tension plate slidably mounted on the inner face of said door having slots therein adapted to register with the slots in the door, guide bolts secured in the door and extending through vertical slots in the tension plate, a spring latch pin carried by the plate adapted to engage in openings adjacent to the bottom of the door to secure the plate in its adjusted position, in combination with a bearing spindle carried by the lower head, a supporting base having a central socket adapted to receive said spindle, and ball bearings arranged on said base to rotatably support said cabinet.

4. A display cabinet comprising upper and lower heads, connecting members arranged in spaced relation between said heads, a plurality of spools rotatably mounted and vertically arranged between said connecting members, a plurality of arcuate guide plates secured in the heads and extending radially from the connecting members, a circular series of drawers having grooves in the upper and lower ends of the sides thereof adapted to receive said guide plates, a plurality of spools rotatably mounted and vertically arranged in each of said drawers, the spools in alternate drawers being in radial alinement with and positioned intermediate of the first named spools, a hinged door for each of the drawers having horizontal slots therein opposite to the spools, a tension plate vertically adjustable upon the inner face of the door having slots therein adapted to register with the slots in the door, means for holding the plate in its adjusted position, in combination with a bearing spindle carried by the lower head, and a supporting base having a central socket to receive said spindle and rotatably support the cabinet.

5. A display cabinet comprising upper and lower heads, connecting members circularly arranged in spaced relation between said heads, a plurality of spools rotatably mounted between the connecting members, guide plates secured in the heads and extending radially from the connecting members, said guide plates being arranged in pairs, a circular series of drawers having grooves in the upper and lower ends at opposite sides to receive the guide members, a plurality of spools rotatably mounted in said drawers, the spools in alternate drawers being in radial alinement with the first named spools and positioned intermediate thereof, a supporting plate extending outwardly from the first named spools and extending between and in advance of the latter spools, a hinged door for each of the drawers, having horizontal slots therein, an adjustable tension plate mounted upon the inner face of the door and provided with slots adapted to register with the slots in the door, means for securing said plate in its adjusted position, a price indicating disk arranged upon the front face of each of the doors immediately above the slots therein in combination with a base and means for rotatably supporting the cabinet thereon.

6. A display cabinet comprising upper and lower heads, connecting members arranged in spaced relation between said heads and extending radially from the center thereof, a plurality of rotatable spools vertically arranged between said members, a circular series of removable drawers between said heads extending radially from said connecting members, guides carried by said heads adapted to engage in the upper and lower ends of said drawers, and means for displaying the material on said spools.

7. A display cabinet comprising upper and lower heads and connecting members therebetween, a plurality of drawers disposed between the heads extending radially from said connecting members, a plurality of spools rotatably mounted in said drawers, and a second plurality of spools rotatably mounted between the connecting members in concentric relation to the first named spools and in radial alinement with the spools in alternate drawers but in a different horizontal plane, and means for displaying the material on said spools.

8. A display cabinet comprising upper and lower heads, a plurality of V-shaped connecting members arranged in spaced relation and extending radially from the center of said heads, a removable drawer disposed between said heads and extending outwardly from the edges of adjacent connecting members, a plurality of spools rotatably mounted and vertically arranged in each of said drawers, a second plurality of spools mounted between the adjacent connecting members, the latter spools being in radial alinement with the spools contained in the drawers and in intermediate horizontal planes, a supporting plate secured between the connecting members and extending outwardly from the spools arranged therebetween into the drawers, said plates being disposed between the spools in said drawers, and means for displaying the material upon said spools.

9. A cabinet comprising upper and lower heads, a plurality of V-shaped connecting members circularly arranged therebetween, drawers slidably disposed between the heads and extending radially from the connecting members, a plurality of rotatable spools vertically arranged in each of said drawers and between the adjacent connecting members, the spools in alternate drawers and those between the connecting members being disposed in radial alinement, a hinged door for each of the doors having horizontal slots therein, the material upon said spools being adapted to extend through said slots to be displayed, and a tension device carried on the inner face of each of said doors adapted to engage the material and prevent its withdrawal from the spools.

10. A display cabinet comprising upper and lower heads and connecting members circularly arranged therebetween, a circular series of drawers slidably mounted between the heads, guide members carried by the heads adapted to engage in slots in the upper and lower ends of the drawers, a plurality of rotatable spools vertically arranged in each of the drawers and between adjacent connecting members, the spools in alternate drawers being disposed in radial alinement with the spools between the connecting members, a hinged door for each of said drawers having a plurality of horizontal slots through which the material carried by the spools is adapted to extend, a vertically slidable tension device mounted on the inner face of each of said doors adapted to be moved over said slots and engage the material to prevent its withdrawal, and means for holding said device against movement.

11. A display cabinet comprising upper and lower heads and connecting members therebetween, a circular series of drawers extending upwardly from the edges of adjacent connecting members and from the center of each of said members, a plurality of spools rotatably mounted in each of the drawers and between the adjacent members, a hinged door for each of said drawers having a plurality of slots therein through which the material carried by the spools is adapted to extend, a price indicating disk arranged in the doors above each of said slots, and a movable tension plate mounted on the inner face of each of said doors having slots adapted to register with the slots in the doors, the movement of said plate being adapted to place the material extending through the slots under tension and prevent its withdrawal, and a resilient member carried by said plates and engaging in openings in said door adapted to normally hold the plate against movement.

In testimony whereof we hereunto affix our signatures in the presence of two witnesses.

WILLIAM F. McCRACKEN.
JOHN G. BRADFORD.

Witnesses:
GRACE P. RICHART,
FRANK H. HESKETT.